United States Patent Office 3,379,707
Patented Apr. 23, 1968

3,379,707
CURING HALOGENATED POLYOLEFINS
Richard B. Lund, Whippany, Arleen C. Pierce, Belleville, Edith Turi, Livingston, and Hendrikus J. Oswald, Morristown, N.J., assignors to Allied Chemical Corporation, New York, N.Y., a corporation of New York
No Drawing. Filed Oct. 20, 1964, Ser. No. 405,253
18 Claims. (Cl. 260—94.9)

ABSTRACT OF THE DISCLOSURE

The invention provides as a curing agent for chlorinated polyethylene, a group of nitrogenous cyclic compounds including various heterocycles such as imidazoles, pyridines, triazines, etc.; aromatic amines, N-bromosuccinimide, triisopropanolamine borate, etc.

This invention relates to a process for curing halogenated polyolefins. More particularly, it relates to a process for curing chlorinated polyethylene to obtain the crosslinked product.

The vulcanization of natural rubber via rubber curing or cure accelerator agents is known, by a mechanism wherein rubber is oxidized by reducing sulfur to sulfides. In the process the rubber is mixed with a vulcanizing or curing agent such as sulfur and heated to 110° to 140° C. A gradual change takes place from a tacky plastic mixture to a nontacky strong very elastic or rigid product. In the rubber field sulfur is generally preferred as a vulcanizing agent; however, selenium, sulfur chloride, m-dinitrobenzene, nitrogen compounds such as di- and triphenylguanidinetetraethylurea and piperidine derivatives are also employed. Known also as rubber curing agents are certain thioimidazoles, mercaptopyrimidines and other amines.

In screening a large number of compounds, on the basis of gel formation, as thermal stabilizers for 60% chlorine containing chlorinated polyethylene, we have discovered a number of compounds which give high gel values of 80% or more indicating excellent crosslinking activity.

It is therefore an object of this invention to provide a process for curing halogenated polyolefins.

It is a further object of this invention to provide a process for obtaining crosslinked chlorinated polyethylene.

It is still a further object to produce a crosslinked chlorinated polyethylene by a simple inexpensive process.

Additional objects and advantages of the invention will become apparent from the following detailed description thereof.

According to our invention, we have now found that the following listed compounds are excellent crosslinking agents for chlorinated polyethylene in amounts ranging up to about 15% by weight of chlorinated polyethylene:

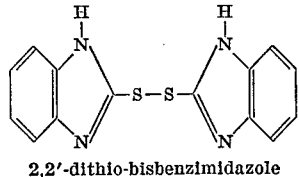

2,2'-dithio-bisbenzimidazole

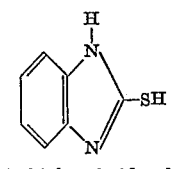

2-thiobenzimidazole

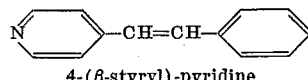

4-(β-styryl)-pyridine

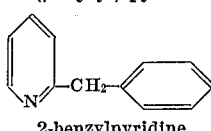

2-benzylpyridine

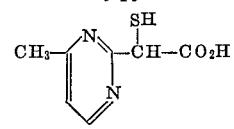

2-(carboxymethylmercapto)-4-methylpyrimidine

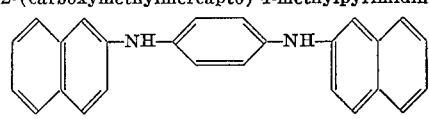

di-(β-naphthyl)-p-phenylene diamine

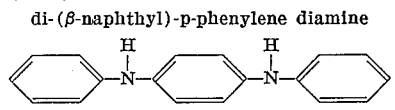

N,N'-diphenyl-p-phenylene diamine

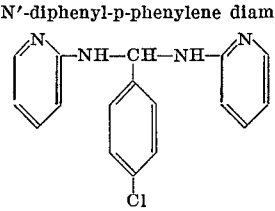

N,N'-dipyridyl-p-chloro-benzylidene diamine

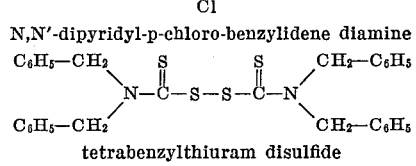

tetrabenzylthiuram disulfide

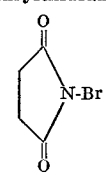

N-bromosuccinimide

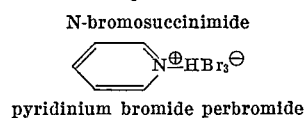

pyridinium bromide perbromide

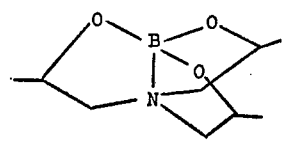

triisopropanolamine borate

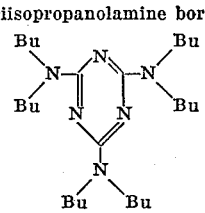

N,N',N''-hexa-n-butylmelamine
N,N',N''-trimethyl melamine
N,N',N''-triethyl melamine
N,N',N''-tri-n-propyl melamine
N,N',N''-tri-n-butyl melamine

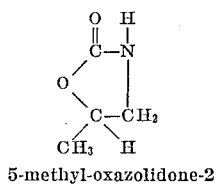

5-methyl-oxazolidone-2

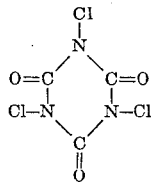

trichloroisocyanuric acid

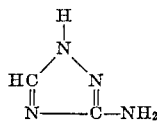

3-amino-1,2,4-triazole

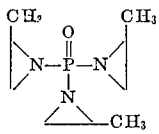

tris[1-(2-methyl)aziridinyl]phosphine oxide

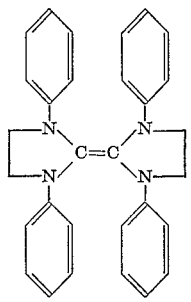

bis(1,3-diphenyl-2-imidazolidinylidene)

When chlorinated polyethylene polymers are heated at elevated temperatures in air they leave an insoluble fraction in mono-chlorobenzene which is known as gel. The amount of gel formation depends upon the severity of conditions to which the polymer has been subjected and is necessarily different for various chlorinated polyethylene polymers, and relate to the thermal instability of the polymers.

Conversely, gel formation is a measure of crosslinking activity when chlorinated polyethylene is heated with the compound in question, i.e. a crosslinking agent. In the preferred method according to our invention we blend powdered chlorinated polyethylene which is 60% chlorine by weight, with about 4% by weight of a selected crosslinking agent, then we heat the blend in air at 200° C. for one hour. Polymers of higher chlorine content are subjected to a higher temperature, for instance up to 230° C. for polymers of 70% chlorine. Measurements are thereafter made on gel formation by calculating the percent gel insoluble in refluxing monochlorobenzene. It is noteworthy that the gelation method for measuring curing, or crosslinking activity is a rapid and sensitive test for such activity.

The chlorinated polyethylene cured by the process of our invention can contain from about 60 to about 70% by weight chlorine. Particularly suitable polyethylenes to be chlorinated for use in our invention are those produced as described in Example 6 of British Patent No. 858,674 of Jan. 11, 1961, to Allied Chemical Corporation. Such polyethylenes can be chlorinated with advantage for use in our invention by the process described in Example 3 of French Patent No. 1,316,044 of Dec. 17, 1962, to Allied Chemical Corporation.

The invention will be described in conjunction with the following specific examples, but it must be understood that the examples are intend for purposes of illustration and are not intended to limit the invention thereto:

Example 1.—This example was run as a control to measure gel formation of chlorinated polyethylene without the addition of a crosslinking agent. Accordingly, 100 grams of powdered chlorinated polyethylene containing 60.1% chlorine by weight, $\eta = 4.2$, was heated in air at 200° C. for one hour. After this interval gel measurements were made by calculaing the precent gel that was insoluble in refluxing monochlorobenzene. Gel formation was found to be 34%.

Examples 2–23.—To 100 grams of chlorinated polyethylene containing 60.1% chlorine by weight, $\eta = 4.2$, were added 4 grams of crosslinking agent. The mixture was then heated in air at 200° for one hour. Measurements on gel formation were made according to the method of Example 1. The results were tabulated in the table below.

The symbol $\eta$ in the foregoing examples has the usual meaning of intrinsic viscosity. It is determined for these polymers in o-dichlorobenzene at 100° C. The method of determination is as in ASTM D–1601–61, the units being deciliters per gram.

| Example No. | Crosslinking Agent | Percent Gel |
|---|---|---|
| 1 | None | 34 |
| 2 | 2,2'-dithio-bisbenzimidazole | 89 |
| 3 | 2-thiobenzimidazole | 93 |
| 4 | 4-(β-styryl)-pyridine | 96 |
| 5 | 2-benzylpyridine | 99 |
| 6 | 2-(carboxymethylmercapto)-4-methylpyrimidine | 88 |
| 7 | Di(β-naphthyl)-p-phenylene diamine | 90 |
| 8 | N,N'-diphenyl-p-phenylene diamine | 92 |
| 9 | N,N'-dipyridyl-p-chloro-benzylidene diamine | 87 |
| 10 | Tetrabenzylthiuram disulfide | 91 |
| 11 | N-bromosuccinimide | 99 |
| 12 | Pyridinium bromide perbromide | 100 |
| 13 | Triisopropanolamine borate | 84 |
| 14 | N,N',N''-hexa-n-butylmelamine | 95 |
| 15 | N,N',N''-trimethyl melamine | 88 |
| 16 | N,N',N''-triethyl melamine | 90 |
| 17 | N,N',N''-tri-n-propyl melamine | 91 |
| 18 | N,N',N''-tri-n-butyl melamine | 87 |
| 19 | 5-methyl-oxazolidone-2 | 80 |
| 20 | Trichloroisocyanuric acid | 91 |
| 21 | 3-amino-1,2,4-triazole | 85 |
| 22 | Tris[1-(2-methyl)aziridinyl phosphine oxide] | 96 |
| 23 | Bis(1,3-diphenyl-2-imidazolidinylidene) | 91 |

It will be seen from the results found in the table that gel formation was remarkably increased over the 34% for the untreated polymer indicating high crosslinkage.

We claim:
1. A curable polymeric composition comprising chlorinated polyethylene having a chlorine content between about 60% and about 70% by weight and a curing agent selected from the group consisting of 2,2'-dithiobisbenzimidazole, 2-thiobenzimidazole, 4-(β-styryl)-pyridine, 2-benzylpyridine, 2-(carboxymethylmercapto)-4-methylpyrimidine, di(β-naphthyl)-p-phenylene diamine, N,N'-diphenyl-p-phenylene diamine, N,N'-dipyridyl-p-chloro-benzylidene diamine, tetrabenzylthiuram disulfide, N-bromosuccinimide, pyridinium bromide perbromide, triisopropanolamine borate, N,N',N''-hexa-n-buylmelamine, N,N',N''-trimethyl melamine, N,N',N''-triethyl melamine, N,N',N''-tri-n-propyl melamine, N,N',N''-tri-n-butyl melamine, 5-methyl-oxazolidone-2, trichloroisocyanuric acid, 3-amino-1,2,4-triazole, tris[1-(2-methyl)-aziridinyl] phosphine oxide, and bis(1,3-diphenyl-2-imidazolidinylidene).

2. A composition according to claim 1 wherein said curing agent comprises no more than about 15% by weight of said chlorinated polyethylene.

3. A composition according to claim 1 wherein said curing agent is N-bromosuccinimide.

4. A composition according to claim 1 wherein said curing agent is pyridinium bromide perbromide.

5. A composition according to claim 1 wherein said curing agent is triisopropanolamine borate.

6. A composition according to claim 1 wherein said chlorinated polyethylene contains about 60% chlorine by weight and said curing agent comprises about 4% by weight of said chlorinated polyethylene.

7. A cured, crosslinked chlorinated polyethylene having a chlorine content between about 60% and about 70% by weight, cured with an agent selected from the group consisting of 2,2'-dithio-bisbenzimidazole, 2 - thiobenzimidazole, 4-(β-styryl)-pyridine, 2-benzylpyridine, 2-(carboxymethylmercapto) - 4 - methylpyrimidine, di - (β-naphthyl)-p-phenylene diamine, N,N'-diphenyl-p-phenylene diamine, N,N'-dipyridyl-p-chlorobenzylidene diamine, tetrabenzylthiuram disulfide, N-bromosuccinimide, pyridinium bromide perbromide, triisopropanolamine borate, N,N',N'' - hexa - n - butylmelamine, N,N',N'' - trimethyl melamine, N,N',N'' - triethyl melamine, N,N',N'' - tri-n-propyl melamine, N,N',N''-tri-n-butyl melamine, 5-methyl-oxazolidone-2, trichloroisocyanuric acid, 3-amino-1,2,4-triazole, tris[1-(2-methyl)aziridinyl]phosphine oxide, and bis(1,3-diphenyl-2-imidazolidinylidene).

8. A composition according to claim 7 wherein said curing agent comprises no more than about 15% by weight of said chlorinated polyethylene.

9. A composition according to claim 7 wherein said curing agent is N-bromosuccinimide.

10. A composition according to claim 7 wherein said curing agent is pyridinium bromide perbromide.

11. A composition according to claim 7 wherein said curing agent is triisopropanolamine borate.

12. A composition according to claim 7 wherein said chlorinated polyethylene contains about 60% chlorine by weight and said curing agent comprises about 4% by weight of said chlorinated polyethylene.

13. A process for the curing of chlorinated polyethylene having a chlorine content between about 60% and about 70% by weight which comprises incorporating into said chlorinated polyethylene a curing agent selected from the group consisting of 2,2'-dithio-bisbenzimidazole, 2-thio-benzimidazole, 4-(β-styryl)-pyridine, 2-benzylpyridine, 2-(carboxymethylmercapto)-4-methylpyrimidine, di-(β - naphthyl) - p - phenylene diamine, N,N'-diphenyl-p-phenylene diamine, N,N'-dipyridyl-p-chloro-benzylidene diamine, tetrabenzylthiuram disulfide, N-bromosuccinimide, pyridinium bromide perbromide, triisopropanolamine borate, N,N',N''-hexa-n-butylmelamine, N,N',N''-trimethyl melamine, N,N',N''-triethyl melamine, N,N'-N''-tri-n-propyl melamine, N,N',N''-tri-n-butyl melamine, 5-methyl-oxazolidone-2, trichloroisocyanuric acid, 3-amino-1,2,4-triazole, tris[1 - (2 - methyl)aziridinyl]phosphine oxide, and bis(1,3-diphenyl-2-imidazolidinylidene), and then heating the mixture in air at a temperature of about 200° C. for a period of about one hour.

14. A process according to claim 13 wherein said curing agent comprises no more than about 15% by weight of said chlorinated polyethylene.

15. A process according to claim 13 wherein said curing agent is N-bromosuccinimide.

16. A process according to claim 13 wherein said curing agent is pyridinium bromide perbromide.

17. A process according to claim 13 wherein said curing agent is triisopropanolamine borate.

18. A process according to claim 13 wherein said chlorinated polyethylene contains about 60% chlorine by weight and said curing agent comprises about 4% by weight of said chlorinated polyethylene.

References Cited

UNITED STATES PATENTS 3,324,088   6/1967   Waldron _____ 260—94.9
3,128,263   4/1964   Wei et al.

JOSEPH L. SCHOFER, *Primary Examiner.*

L. EDELMAN, *Assistant Examiner.*